March 3, 1970     U. SCHMIDT ET AL     3,499,162
DEVICE FOR MEASURING AND RECORDING RESPECTIVELY THE LIGHT
RADIATION REFLECTED FROM INDIVIDUAL POINTS OF AN OBJECT
Filed Oct. 4, 1966
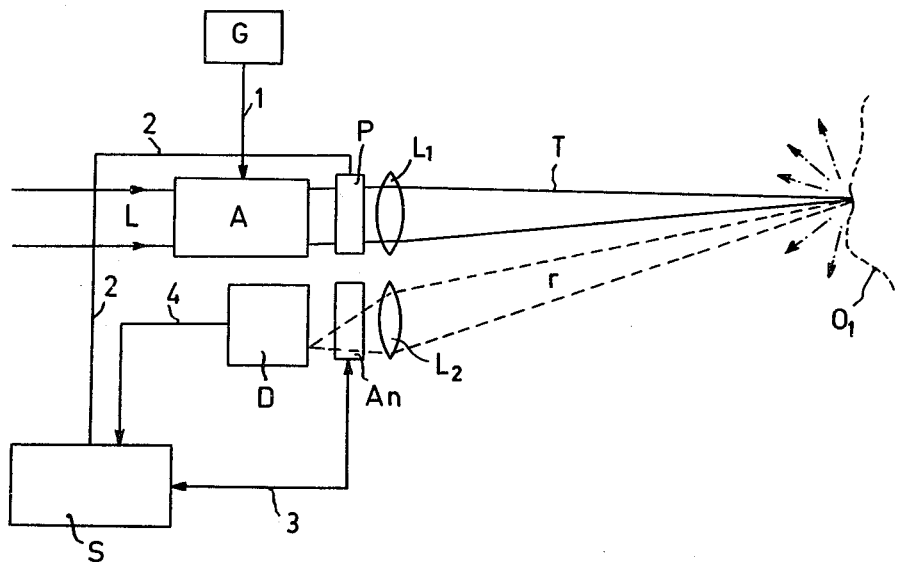
INVENTORS
UWE SCHMIDT
KARL J. SCHMIDT-TIEDEMAN
BY
AGENT

3,499,162
DEVICE FOR MEASURING AND RECORDING RESPECTIVELY THE LIGHT RADIATION REFLECTED FROM INDIVIDUAL POINTS OF AN OBJECT

Uwe Schmidt, Hamburg-Wandsbek, and Karl Joachim Schmidt-Tiedeman, Rellingen, Germany, assignors, by mesne assignments, to U.S. Philips Corporation, New York, N.Y., a corporation of Delaware
Filed Oct. 4, 1966, Ser. No. 584,200
Claims priority, application Germany, Oct. 22, 1965, P 37,942
Int. Cl. H01j 39/12; G02f 1/28
U.S. Cl. 250—225  3 Claims

ABSTRACT OF THE DISCLOSURE

A device for optically scanning an object wherein a laser light beam is digitally deflected in a point-by-point manner across the object by means of an electrically controllable digital light beam deflector and a photosensitive element upon which light reflected from the object is incident.

---

The invention relates to a device for measuring and recording respectively the light radiation reflected from individual points of an object while using at least one photosensitive element on which the reflected light is incident.

It is known to photograph objects through clouds by means of infrared rays and photographic films which are sensitive to said rays. This method is also very suitable at night since many objects often are somewhat heated and consequently emit infrared rays which can then be photographed. However, one depends upon the infrared radiation which is emitted by the objects themselves. It would therefore be preferable to emit an infrared ray and then to photograph the reflected light. This method is undesirable in particular in those uses in which the possibility of recovery is to be decreased, for, if a photodetector is arranged near the objects to be photographed, said photodetector, which is sensitive to infrared, would immediately indicate when an infrared ray impinges. It is also known per se from radar technology to scan an object pointwise by means of eletromagnetic rays of a very short wavelength and to receive the reflected signal and make it visible on a cathode ray tube. However, radar apparatus is very expensive and requires very large aerials so that said method is not suitable for transportable devices.

The invention solves the said problems and is characterized in that the light radiation reflected from the object is produced by means of a laser light beam deflected by an electronically controllable digital light beam deflector.

The invention is based on the following recognition. If a digital light beam deflector is used, this deflector has very short switching times of approximately 150 nsec. to 1 $\mu$sec. i.e., the deflected laser beam remains at one point for a very short moment only. In addition, the laser beam is highly concentrated, i.e. it has a very small diameter so that for scanning an image it must scan a great number of points. In the case of a large infrared ray the discovery detector can be arranged at any given point, the large beam will always impinge on it. However, in the case of the infrared laser beam this is the case only for a very short moment. In addition, the device according to the invention has the advantage that it is small and can readily be handled. Therefore the device can be transported to many places and is particularly suitable for making television recordings at night.

It is noted that a digital light beam deflector is known per se from British patent specification 994,955.

In order that the invention may readily be carried into effect it will now be described in greater detail, by way of example, with reference to the accompanying drawing.

The figure of the drawing diagrammatically shows the construction of such an active image scanning device. A laser light beam L is applied to a digital electronic deflector A comprising, for example, Kerr cells and deflection prisms. The deflection prisms consist of birefringent material while as electro-optical elements Pockel cells may be used which serve as polarization switches. For this purpose magneto-optical elements may also be used, as for example, Farady insulators and rotators, respectively.

The deflection voltages for the horizontal and the vertical movement of the laser beam L are applied from a generator G to the digital light beam deflector A through a line 1. As a result of this the laser beam L, after having been converted by a lens $L_1$ into a converging light beam T, can scan the object $O_1$ pointwise both in a horizontal and in a vertical direction. The reflected beam $r$ is focused on the photodetector D by a second lens $L_2$, and photodetector D supplies an electric signal to the signal converter S through a line 4. The signal amplified in the signal converter S may then be applied to a cathode ray tube and made visible on that tube. The signal from the signal converter S, however, may also be recorded in a recording device, for example, a tape recorder, for being recorded on it and reproduced afterwards. However, the signal may also be modulated on a carrier and then be transmitted.

As appears from British patent specifications 994,955 a digital light beam deflector A always uses polarized light. Since in many objects the reflection properties depend upon the polarization of the impinging light, it may be useful to scan the object $O_1$ with light of varying polarization degree. For this purpose the light beam deflector A may be provided at the output with a polarization switch P which enables the conversion of the emanating scanning light beam T into an arbitrary polarization condition. The polarization switching signal is supplied also by the signal generator S through the line 2. If required, the photodetector D may be preceded by an analyzer $A_n$ by which it is possible to obtain further data regarding the polarization properties of the object $O_1$. Also for this analyzer the signal generator S supplies the required voltages through the line 3. If the signal-to-noise ratio is sufficiently large, the lens $L_2$ need not necessarily be present.

When using the reproducing lens $L_2$ instead of the one detector, several detectors arranged beside one another may be used, the voltages of which together with the deflection voltages serving as voltage pulses are the signal voltages to be handled further which are derived from the signal generator S and are applied to an image tube or may be used as modulation voltages.

For scanning objects with several optical frequencies, as is required, for example, in colour television, the device described may be extended in such manner that laser light sources of corresponding frequencies are used in conjunction with dichroic elements.

What is claimed is:

1. An optical scanning and detection device comprising a digital beam deflector, a signal generator coupled to said deflector for supplying deflection voltages thereto, a laser beam applied to said deflector, said digital deflector deflecting said beam in a point by point manner along an object to be scanned, said object reflecting light incident thereon, a photodetector, said detector preceded by a first lens positioned in said beam for focusing said beam into a point on said object, and means including a second lens positioned in said reflected beam for focusing the light reflected from said object on to said photodetector for converting said reflected light into an electrical signal containing information indicative of said object.

2. A device as claimed in claim 1 wherein said photodetector is preceded by an analyzer, said analyzer being responsive to the signal generator supplying the deflection voltages.

3. A device as claimed in claim 1 including a polarization switch arranged between said deflector and said object and responsive to said signal generator for subjecting said beam to varying degrees of polarization.

References Cited

UNITED STATES PATENTS

| | | |
|---|---|---|
| 3,368,209 | 2/1968 | McGlauchlin et al. |
| 3,391,970 | 7/1968 | Sincerbox _____ 350—150 |
| 3,316,348 | 4/1967 | Hufnagel et al. _____ 350—7 |
| 3,146,350 | 8/1964 | Topfer. |
| Re. 26,170 | 3/1967 | Harris _____ 346—107 |
| 3,016,464 | 1/1962 | Bailey. |
| 3,154,371 | 10/1964 | Johnson _____ 350—7 X |

OTHER REFERENCES

Benson et al., "Highlights of Army Communications and Electronics R and D," Nerem Record, November 1962, pp. 34–35.

Kurtz, S. K., "Design of an Electro-Optic Polorization Switch . . ." The Bell Technical Journal, October 1966, Manuscript 4–1966.

PAUL R. GILLIAM, Primary Examiner

U.S. Cl. X.R.

350—7